US012147196B2

(12) United States Patent
Lemonnier et al.

(10) Patent No.: US 12,147,196 B2
(45) Date of Patent: Nov. 19, 2024

(54) SELECTION AND ACTUATION DEVICE FOR A PLURALITY OF FUNCTIONS OF A WATCH MOVEMENT

(71) Applicant: MANUFACTURE D'HORLOGERIE AUDEMARS PIGUET SA, Le Brassus (CH)

(72) Inventors: Marc Lemonnier, Les Rousses (FR); Arthur Paris, Remoray-Boujeons (FR)

(73) Assignee: MANUFACTURE D'HORLOGERIE AUDEMARS PIGUET SA, le Brassus (CH)

(*) Notice: Subject to any disclaimer, the term of this patent is extended or adjusted under 35 U.S.C. 154(b) by 421 days.

(21) Appl. No.: 17/711,348

(22) Filed: Apr. 1, 2022

(65) Prior Publication Data

US 2022/0326658 A1 Oct. 13, 2022

(30) Foreign Application Priority Data

Apr. 7, 2021 (CH) .................................... 00357/21

(51) Int. Cl.
*G04B 27/06* (2006.01)
*G04B 27/00* (2006.01)
*G04B 35/00* (2006.01)

(52) U.S. Cl.
CPC ........... *G04B 27/06* (2013.01); *G04B 27/001* (2013.01); *G04B 35/00* (2013.01)

(58) Field of Classification Search
CPC ...... G04B 27/06; G04B 27/001; G04B 35/00; G04B 19/25; G04B 27/04; G04B 27/004; G04B 13/00; G04B 33/00
See application file for complete search history.

(56) References Cited

U.S. PATENT DOCUMENTS

| | | | | |
|---|---|---|---|---|
| 2,023,022 A * | 12/1935 | Johnston | G04B 27/06 | 968/75 |
| 2,228,681 A * | 1/1941 | Wagner | G04B 27/06 | 968/260 |

(Continued)

FOREIGN PATENT DOCUMENTS

| | | |
|---|---|---|
| CH | 568604 | 10/1975 |
| EP | 3584644 | 12/2019 |
| JP | S50-072667 A | 6/1975 |

OTHER PUBLICATIONS

Search Report for CH 00357/21, dated Apr. 7, 2021, 3 pages.

*Primary Examiner* — Sean Kayes
(74) *Attorney, Agent, or Firm* — NIXON & VANDERHYE

(57) ABSTRACT

A selection and actuation device for at least a first and second function of a watch movement includes a translationally and rotationally movable control stem respectively selecting and actuating at least one of the functions. The control stem occupies at least first, second and third distinct, successive axial positions. An actuating lever bears first and second wheels and pinions. The actuating lever occupies a neutral position when the control stem is in one of its first and third positions, and pivots, on either side of the neutral position, between a first driving position actuating the first function responsive to control stem rotation in a first direction, and a second driving position actuating the second function responsive to a control stem rotation in a second direction. Also disclosed is a movement including such a selection and actuation device as well as to a timepiece including such a movement.

20 Claims, 9 Drawing Sheets

(56) References Cited

U.S. PATENT DOCUMENTS

| | | | | | |
|---|---|---|---|---|---|
| 3,609,955 | A | * | 10/1971 | Suzuki | G04B 19/25 368/36 |
| 3,645,090 | A | * | 2/1972 | Chappatte | G04B 27/04 968/251 |
| 3,797,226 | A | * | 3/1974 | Inoki | G04B 27/004 368/197 |
| 3,890,778 | A | | 6/1975 | Aeschmann | |
| 4,127,985 | A | * | 12/1978 | Murrle | G04B 19/25 368/35 |
| 6,295,249 | B1 | * | 9/2001 | Takahashi | G04B 27/06 368/190 |

* cited by examiner

SELECTION AND ACTUATION DEVICE FOR A PLURALITY OF FUNCTIONS OF A WATCH MOVEMENT

CROSS-REFERENCE TO RELATED APPLICATIONS

This application claims priority to CH Patent Application No. 00357/21, filed Apr. 7, 2021, the entire contents of which is hereby incorporated herein by reference.

BACKGROUND OF THE INVENTION

Field of the Invention

The present invention relates to a selection and actuation device for a plurality of functions of a watch movement comprising at least a first function of a first mechanism of the movement and a second function of a second mechanism of the movement, said device comprising a translationally and rotationally movable control stem for respectively selecting and actuating at least one or the other of said functions, said control stem being arranged to be capable of occupying at least first, second and third distinct, successive axial positions, said device comprising means for actuating at least the first and the second functions, which means are arranged to be kinematically linked to the control stem such that one of the first and second functions can be actuated after having been selected solely by an axial translational movement of the control stem from its first position to its second position, and such that the other of the first and second functions can be actuated after having been selected solely by an axial translational movement of the control stem from its third position to its second position.

The present invention also relates to a watch movement comprising such a device as well as to a timepiece comprising such a movement.

Description of the Related Art

Selection and actuation devices for a plurality of functions of a watch movement are mechanisms used in watches to make it possible to bring together the selection and actuation of a plurality of functions on a single control stem. The control stem may be for example a winding stem which is arranged to occupy a first resting position, corresponding to a winding position, a second intermediate pulled out position, corresponding to a position for selecting and actuating a date correction for example or another function, and a third extreme pulled out position, corresponding to a hand-setting position.

This type of stem is therefore limited to the selection and actuation of three functions, namely winding, correction, and hand-setting.

Grand complication watches have to include a plurality of control stems or correctors distributed around the watch case, which makes the watch complicated to use. This also affects the aesthetics of the watch and increases the risk of tightness issues. Furthermore, certain correctors have to actuated by means of a stylus, which impairs user-friendliness.

It is also possible to provide function selectors, but these mechanisms are complex to implement.

In order to reduce the number of correctors, CH 568 604 has proposed a correction device which enables the correction of an indicating organ once the correction position has been selected by pulling out the control stem from its first to its second position, and enables the correction of another indicating organ once the correction position has been selected by pressing on the control stem and so returning it from its third to its second position. To this end, the correction device in particular comprises a rod comprising a shaft guided in a recess and on which a correction wheel is pivotally mounted. The rod moves between a high position and a low position corresponding to the two extreme positions which the shaft of the rod can assume when it passes from one end to the other of the recess when the control stem is pulled into the third position or pushed into its first position such that the correction wheel is in kinematic linkage, on the one hand, with one or the other of the indicating organs to be corrected and, on the other hand, with the control stem when said control stem is pulled or pushed into its second position. As a result, the movement of the correction wheel is limited by the high and low positions of the rod, and is therefore reduced. Consequently, this design in particular has the drawback of requiring that the indicating organs which are to be corrected be concentrated in the same zone around the correction wheel, so limiting options for arranging the mechanisms associated with the indicating organs to be corrected in the movement.

It is an object of the present invention to remedy these drawbacks by proposing a selection and actuation device for a plurality of functions of a watch movement which is easy to use and user-friendly.

A further object of the present invention is to propose a selection and actuation device for a plurality of functions of a watch movement which can be based on the known design of a winding stem and allows the selection and actuation of additional functions to be added without modifying the basic three-position mechanism of the winding stem mechanism and while allowing the designer great freedom with regard to the arrangement of the mechanisms associated with these additional functions within the movement.

SUMMARY OF THE INVENTION

To this end, the invention relates to a selection and actuation device for a plurality of functions of a watch movement comprising at least a first function of a first mechanism of the movement and a second function of a second mechanism of the movement, said device comprising a translationally and rotationally movable control stem for respectively selecting and actuating at least one or the other of said functions, said control stem being arranged to be capable of occupying at least first, second and third distinct, successive axial positions, said device comprising means for actuating at least the first and the second functions, which means are arranged to be kinematically linked to the control stem such that one of the first and second functions can be actuated after having been selected solely by an axial translational movement of the control stem from its first position to its second position, and such that the other of the first and second functions can be actuated after having been selected solely by an axial translational movement of the control stem from its third position to its second position.

According to the invention, the means for actuating at least the first function and the second function comprise an actuating lever bearing at least a first wheel and pinion and a second wheel and pinion, said actuating lever being arranged to be capable of occupying a neutral position when the control stem is in one of its first and third positions, and to be capable of pivoting, on either side of said neutral position, between a first driving position in which said first wheel and pinion is kinematically linked to the control stem in order to be capable of actuating at least the first function in response to a rotation of the control stem in at least a first direction and a second driving position in which said second wheel and pinion is kinematically linked to the control stem in order to be capable of actuating at least the second function in response to a rotation of the control stem in at least a second direction, identical to or different from the first direction, said actuating lever being arranged to pivot into its first driving position when the first function is selected and to pivot into its second driving position when the second function is selected.

Advantageously, the actuating lever is pivotally mounted about an axis perpendicular and secant to a neutral axis defined by the direction of the control stem, the first wheel and pinion and the second wheel and pinion being disposed on each side of said neutral axis.

Thus, thanks to the lever bearing two wheels and pinions and pivoting on either side of the neutral axis, between its first and second driving positions, the device according to the invention makes it possible to benefit from a better distribution of the first and second driving positions on each side of the neutral position. Consequently, when arranging the plate, it is possible to distribute the first and second mechanisms of the movement as a function of the first and second driving positions of the actuating lever which bears the wheels and pinions disposed on each side of the neutral axis in order to be capable of actuating their respective mechanisms, while benefiting from a great freedom of arrangement.

Advantageously, the actuating lever may be arranged to be capable of actuating a third function of a third mechanism of the movement when said lever is in its first driving position in response to a rotation of the control stem in a third direction opposed to the first direction, selection of the third function being made concomitantly with selection of the first function.

Advantageously, the actuating lever may comprise a third wheel and pinion arranged to be capable of meshing with the third mechanism when the actuating lever is in its first driving position and the first wheel and pinion is mounted slidingly so as to mesh with and drive the third wheel and pinion when the control stem is axially rotated in the third direction to actuate the third function.

Thus, when the control stem has been moved into the second intermediate position to select the first function, bidirectional actuation is obtained, it being possible to actuate said first function by turning the control stem in one direction, and it being possible to actuate the third function by turning the control stem in the other direction.

Likewise, the actuating lever may be arranged to be capable of actuating a fourth function of a fourth mechanism of the movement when said lever is in its second driving position in response to a rotation of the control stem in a fourth direction opposed to the second direction, selection of the fourth function being made concomitantly with selection of the second function.

The actuating lever may then comprise a fourth wheel and pinion arranged to be capable of meshing with the fourth mechanism when the actuating lever is in its second driving position and the second wheel and pinion is mounted slidingly so as to mesh with and drive the fourth wheel and pinion when the control stem is axially rotated in the fourth direction to actuate the fourth function.

Thus, when the control stem has been moved into the second intermediate position to select the second function, bidirectional actuation is obtained, it being possible to actuate said second function by turning the control stem in one direction, and it being possible to actuate the fourth function by turning the control stem in the other direction.

Using bidirectional actuation makes it possible to double the number of functions which can be selected and actuated by the control stem once it is positioned in the second position.

The device according to the invention therefore makes it possible to select and actuate up to four different independent functions by means of a control stem positioned in an intermediate position without modifying the basic three-position mechanism of the control stem.

Thus, in the case of a control stem arranged to be capable of actuating two functions in the first position and two other functions in the third position, it is possible to obtain a device which makes it possible to select and actuate up to eight functions by means of a single three-position control stem. It is therefore no longer necessary to provide additional correctors which are both unsightly and complex to handle.

The selection and actuation device according to the invention comprises control means for the actuating lever which are arranged to cooperate with the control stem in order to move themselves and to control the movements of the actuating lever between its first and second driving positions during the axial translational movements of said control stem into its various positions.

Advantageously, said control means for the actuating lever may be constituted by a pull-out piece which fits into a groove of the control stem and having at its end a pin arranged to cooperate with the actuating lever.

Thus, when the control stem is a three-position winding stem, the pull-out piece is based on the design of the winding pull-out piece conventionally used in a winding and setting mechanism.

Advantageously, the actuating lever bears a cam having a profile arranged to cooperate with the pin of the pull-out piece in order to be able to pivot said actuating lever, positioned in its neutral position when the control stem is in one of its first and third positions, in one direction into one of its first and second driving positions and in the other direction into the other of its first and second driving positions, alternately, for each movement of the control stem into its second position from its first or third position.

According to one preferred embodiment, the cam profile is parallelepipedal in shape, the four lateral faces of which form pairs of inclined parallel planes along which the pin of the pull-out piece moves during the successive axial translational movements of said control stem into its various positions.

Preferably, and more particularly when the pull-out piece is a winding pull-out piece, the pull-out piece is arranged to control a movement of a castle wheel mounted slidingly on the control stem to mesh with a first intermediate wheel when the control stem is in its second or third position, said first intermediate wheel being arranged to kinematically link the control stem to the first wheel and pinion or to the second wheel and pinion when the control stem is in its second position.

Advantageously, the pull-out piece is arranged to cooperate with a linking lever bearing geartrains kinematically linked to the first intermediate wheel and arranged to be capable of pivoting when the control stem is moved into its third position when at least a fifth function of a fifth mechanism of the movement is selected so as to position said geartrains in kinematic linkage with said fifth mechanism and to return to its position when the control stem is moved from its third to its second position.

Advantageously, the first wheel and pinion is arranged to be capable of meshing with the first mechanism when the actuating lever is in its first driving position and to be driven by the first intermediate wheel when the control stem is axially rotated in the first direction to actuate the first function, and the second wheel and pinion is arranged to be capable of meshing with the second mechanism when the actuating lever is in its second driving position and to be driven by means of the first intermediate wheel when the control stem is axially rotated in the second direction to actuate the second function.

According to preferred embodiments, the first and second functions may be correction functions for mechanisms of the movement.

Likewise, the third and fourth functions may be correction functions for mechanisms of the movement.

According to one preferred embodiment, the fifth function selected when the control stem is in its third position is a hand-setting function.

According to one preferred embodiment, the control stem is a winding stem and the first position of said winding stem is a winding position.

Thus, the selection and actuation device according to the invention may readily be fitted on a three-position winding stem without modifying its basic mechanism.

According to one preferred embodiment, the axial translational movement of the control stem from its first position to its second position is in response to an axial pulling action on said control stem and the axial translational movement of the control stem from its third position to its second position is in response to an axial pressing action on said control stem.

Thus, the first or second functions may easily and simply be selected respectively by pulling the control stem from its first to its second position, or by pushing the control stem from its third to its second position, these functions likewise easily being actuated simply by turning the control stem. No correction tool is required.

The present invention also relates to a movement comprising a selection and actuation device as defined above as well as to a timepiece comprising such a movement.

BRIEF DESCRIPTION OF THE DRAWINGS

Other features and advantages of the present invention will become apparent from reading the following detailed description of an embodiment of the invention, which is provided by way of non-limiting example and made with reference to the appended drawings in which.

DESCRIPTION OF THE PREFERRED EMBODIMENTS

Figure 1:
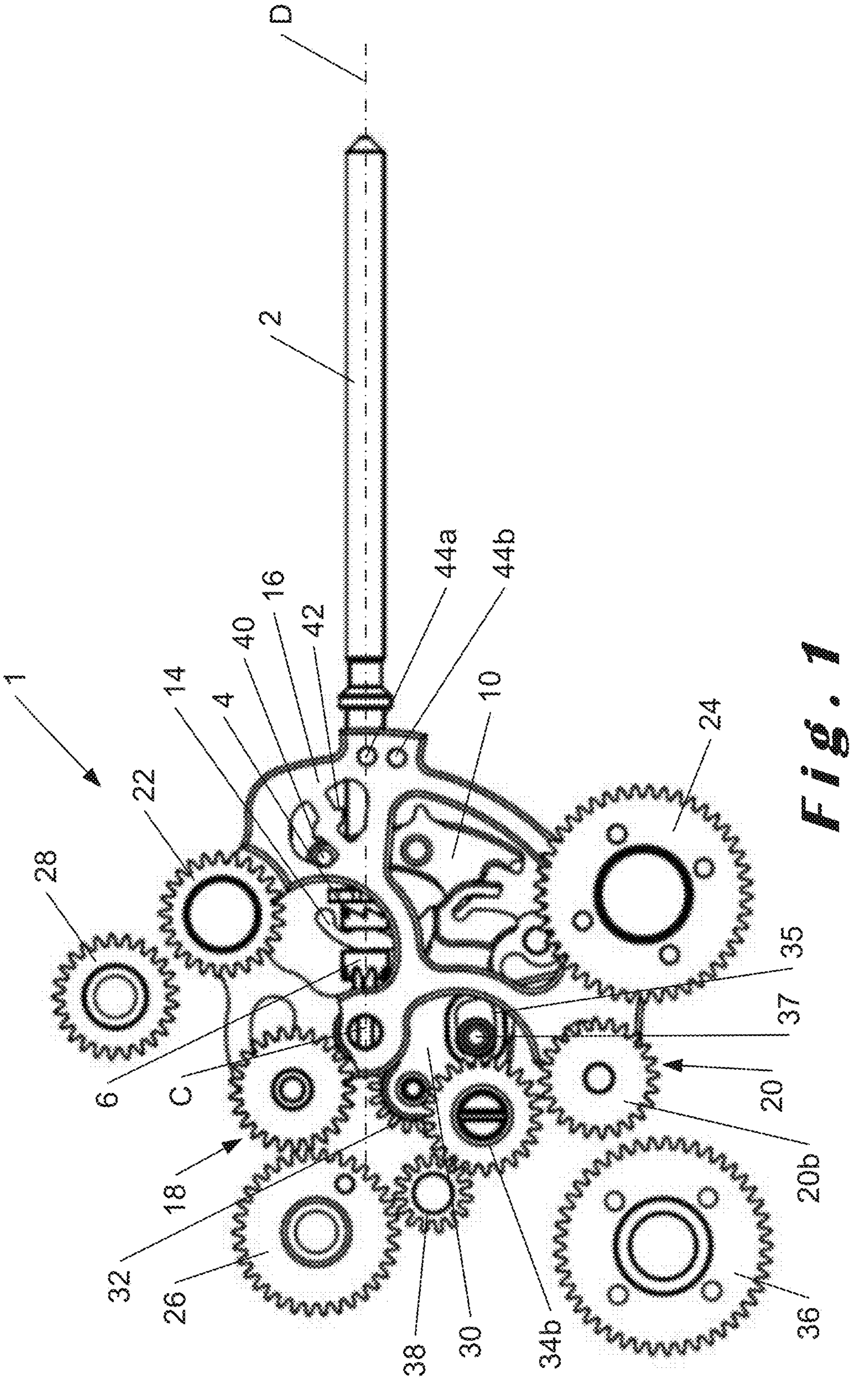
FIG. 1 is a plan view, from the dial side, of a selection and actuation device according to the invention, when the control stem is in the first resting position, corresponding to the winding position.

With reference to FIGS. 1 to 4, the present invention relates to a selection and actuation device 1 for a plurality of functions of a watch movement by means of a single control stem 2 movable in axial translation and in axial rotation for respectively selecting and actuating one or the other of said functions.

In the example described below, the control stem 2 is a winding stem, and the functions comprise first, second, third and fourth functions respectively of first, second, third and fourth mechanisms of the movement, hand-setting and winding.

Advantageously, the first, second, third and fourth functions are correction functions, the first, second, third and fourth mechanisms possibly being a date, day, week, month, year, time zone, moon or sky mechanism or any other display mechanism of an indication managed by the movement. The functions to be selected and actuated may also be winding functions, such as winding of a main barrel of the movement or an auxiliary barrel, for example a striking or chronograph barrel. The functions to be selected and actuated may also be setting functions, such as setting the current time for hand-setting or setting a striking time or an alarm.

In standard manner, the control stem 2 is arranged to be capable of occupying three distinct successive axial positions, i.e. obtained for example by passing from one to the other in ordered manner, by successive axial pulling or pressing actions.

In the remainder of the description, the first position of the control stem 2 is defined as being the resting position, corresponding to the winding position, when the winding stem is pushed in, the winding crown being at its closest to the watch case. The second, intermediate position, obtained by an axial translational movement of the control stem 2 from its first position, in response to a first axial pulling action, corresponds to the position for selecting and actuating the first, second, third and fourth functions, as will be described in detail hereafter. The third position, obtained by a new axial translational movement of the control stem 2 from its second position, in response to a second axial pulling action on said stem, corresponds to the hand-setting position. Return from the third position to the first position is performed by axial translational movements of the stem 2 in the opposite direction, in response to a first pressing action on the control stem 2 to return it to its intermediate second position and then in response to a second pressing action to return to the first position.

In standard manner, a winding pinion 4 and a castle wheel 6, which mesh when the control stem 2 is in winding position, are provided on the control 2 or winding stem. The castle wheel 6 is mounted slidingly on the stem 2 to be capable of meshing with a first intermediate wheel 8, which is freely rotatably mounted on the movement frame, in particular when the control stem 2 is in its third, hand-setting position, as will be described hereafter, but also when the control stem 2 is in its second position.

A pull-out piece 10 pivotally mounted at A is also provided. The pull-out piece 10 comprises a stud 12 (cf. FIGS. 2 and 4) arranged to fit into a groove of the control stem 2, such that the pull-out piece 10 pivots at A when the stem 2 is pulled.

A return-bar 14 equipped with its spring and pivotally mounted at B is also provided. Said return-bar 14 is arranged to cooperate with the castle wheel 6 so as to cause it to slide and move into contact with the first intermediate wheel 8 when the control stem 2 is moved into its second position, the return-bar 14 then being pushed by the pull-out piece 10 to pivot it about its axis B. Meshing between the castle wheel 6 and the first intermediate wheel 8 is maintained when the control stem 2 is moved into its third, hand-setting position.

These winding and setting mechanisms are known to a person skilled in the art and require no more detailed description.

The selection and actuation device 1 comprises means for actuating at least the first and the second functions which are arranged to be kinematically linked to the control stem 2 such that one of the first and second functions can be actuated once it has been selected solely by an axial translational movement of the control stem 2 from its first position to its second position, in response to an axial pulling action on said control stem 2, and such that the other of the first and second functions can be actuated once it has been selected solely by an axial translational movement of the control stem 2 from its third position to its second position, in response to an axial pressing action on said control stem 2.

According to the invention, the means for actuating at least the first function and the second function comprise an actuating lever 16 mounted on the frame pivotally about an axis C perpendicular and secant to a neutral axis D defined by the direction of the control stem 2. Said actuating lever 16 bears at least a first wheel and pinion 18 and a second wheel and pinion 20, said first wheel and pinion 18 and said second wheel and pinion 20 advantageously being disposed on each side of said neutral axis D. The actuating lever 16 is arranged to be capable of occupying a neutral position when the control stem 2 is in one of its first and third positions, and to be capable of pivoting, on either side of said neutral axis D, between a first driving position in which said first wheel and pinion 18 is kinematically linked to the control stem 2 in order to be capable of actuating at least the first function in response to a rotation of the control stem 2 in at least a first direction and a second driving position in which said second wheel and pinion 20 is kinematically linked to the control stem 2 in order to be capable of actuating at least the second function in response to a rotation of the control stem 2 in at least a second direction, identical to or different from the first direction, said actuating lever 16 being arranged to pivot into its first driving position when the first function is selected and to pivot into its second driving position when the second function is selected.

Furthermore, in the example described, the actuating lever 16 is also arranged to be capable of actuating a third function of a third mechanism of the movement, selection of the third function being made concomitantly with selection of the first function, in response to an axial pulling action on the control stem 2 from its first position to its second position, and to be capable of actuating a fourth function of a fourth mechanism of the movement, selection of the fourth function being made concomitantly with selection of the second function, in response to an axial pressing action on the control stem 2 from its third position to its second position.

To this end, the actuating lever 16 here bears four wheels and pinions, namely the first wheel and pinion 18, the second wheel and pinion 20, a third wheel and pinion 22, and a fourth wheel and pinion 24, borne by the different arms of the actuating lever 16. The first and third wheels and pinions 18, 22 are positioned on the same side in relation to the neutral axis D. The second and fourth wheels and pinions 20, 24 are both positioned on the other side of the neutral axis D. Here, advantageously, the actuating lever 16 is pivotally mounted about its axis C coaxially with the first intermediate wheel 8 but it is quite clear that any other appropriate configuration may be considered in which the pivot axis C of the actuating lever 16 is not coaxial with the first intermediate wheel 8. The actuating lever 16 with its four wheels and pinions is arranged to be capable of occupying its neutral position when the control stem 2 is in one of its first and third positions and to be capable of pivoting between its first driving position in which the first wheel and pinion 18, kinematically linked to the control stem 2 via the first intermediate wheel 8 and the castle wheel 6, is arranged to be capable of actuating the first function in response to a rotation of the control stem 2 in a first direction, for example the clockwise direction, and the third wheel and pinion 22 is arranged to be kinematically linked to the control stem 2 so as to be capable of actuating the third function in response to a rotation of the control stem 2 in the other direction, for example the anticlockwise direction, and its second driving position in which the second wheel and pinion 20, then kinematically linked to the control stem 2, is arranged to be capable of actuating the second function in response to a rotation of the control stem 2 in a second direction, for example the anticlockwise direction, and the fourth wheel and pinion 24 is arranged to be kinematically linked to the control stem 2 so as to be capable of actuating the fourth function in response to a rotation of the control stem 2 in the other direction, for example the clockwise direction, said actuating lever 16 with its four wheels and pinions being arranged to pivot into its first driving position, from its neutral position, when the first or third function is selected, solely by pulling the control stem 2 from its first to its second position, and to pivot into its second driving position, from the same neutral position, when the second or fourth function is selected, solely by pressing the control stem 2 from its third to its second position.

The first intermediate wheel 8 is arranged to kinematically link the control stem 2 to the different wheels and pinions which actuate the different functions, and more particularly to the first wheel and pinion 18 or to the second wheel and pinion 20, via the castle wheel 6, when the control stem is in its second position as seen above.

More specifically, the actuating lever 16 comprises a first side arm **16*a* bearing the first and third wheels and pinions 18, 22 and a second side arm 16*b* bearing the second and fourth wheels and pinions 20, 24, the first and second side arms being connected by a central arm 16***c* and being disposed on either side of the centre of rotation C in the axial direction of the control stem 2. The actuating lever 16 is positioned in relation to the control stem 2 such that its side arms 16*a*, 16*b* are disposed on either side of the control stem 2, according to its axial direction, i.e. on either side of the neutral axis D.

The first wheel and pinion 18 comprises two stepped pinions 18*a*, 18*b*, and is positioned on the arm 16*a* of the actuating lever 16 such that the pinion 18*a* always meshes with the first intermediate wheel 8. The pinion 18*b* of the first wheel and pinion 18 is arranged to mesh for example with a wheel 26 of a first mechanism when the actuating lever 16 is positioned in its first driving position. Thus, when the control stem 2 rotates in clockwise direction, the pinion 18*b* of the first wheel and pinion 18 is driven by said first intermediate wheel 8, via the pinion 18*a*, to drive said wheel 26 and thus actuate the first function of the first mechanism. The first intermediate wheel 8 is driven by the castle wheel 6 which has moved when the control stem moves into its second position.

Furthermore, the first wheel and pinion 18 is mounted slidingly on the actuating lever 16 such that the pinion 18*b* meshes with the third wheel and pinion 22 when the control stem 2 is turned in anticlockwise direction. This third wheel and pinion 22 is arranged to mesh for example with a wheel 28 of a third mechanism when the actuating lever 16 is positioned in its first driving position. Thus, when the control stem 2 rotates in anticlockwise direction, the third wheel and pinion 22 is driven by said first intermediate wheel 8, via the first wheel and pinion 18*a*, to drive said wheel 28 and thus actuate the third function of the third mechanism.

The second wheel and pinion 20 comprises a pinion 20*a* and a wheel 20*b*, and is positioned on the arm 16*b* of the actuating lever 16 such that the pinion 20*a* can be kinematically linked to the control stem 2 when the actuating lever 16 is in its second driving position.

To this end, a linking lever 30, corresponding here to a hand-setting lever, pivotally mounted at C on the frame, is provided coaxially with the actuating lever 16. It is obvious that the configuration of the linking lever 30 may be different, its pivot axis possibly not being coaxial with that of the actuating lever 16. The linking lever 30 bears geartrains kinematically linked to the first intermediate wheel 8, and more particularly a wheel 32 always meshed with the first intermediate wheel 8, and a wheel and pinion 34 which comprises a pinion 34*a* meshing with the wheel 32 and a wheel 34*b*. The linking lever 30 comprises an opening 35 which moves in relation to a stud 37 provided on the frame to form end stops.

When the actuating lever 16 is in its second driving position, the linking lever 30 is positioned such that the wheel 34*b* of the wheel and pinion 34 meshes with the pinion 20*a* of the second wheel and pinion 20. Furthermore, the wheel 20*b* of the second wheel and pinion 20 is arranged to be capable of meshing for example with a wheel 36 of a second mechanism when the actuating lever 16 is positioned in its second driving position. Thus, when the control stem 2 rotates in anticlockwise direction, the pinion 20*a* of the second wheel and pinion 20 is driven by the first intermediate wheel 8, via the wheels 32 and 34 of the linking lever 30, such that the wheel 20*b* drives the wheel 36 so as to actuate the second function of the second mechanism.

Furthermore, the second wheel and pinion 20 is mounted slidingly on the actuating lever 16 such that the wheel 20*b* of the wheel and pinion 20 meshes with the fourth wheel and pinion 24 when the control stem 2 is turned in clockwise direction. This fourth wheel and pinion 24 is arranged to cooperate for example with a geartrain (not shown) of a fourth mechanism when the actuating lever 16 is positioned in its second driving position. Thus, when the control stem 2 rotates in clockwise direction, the fourth wheel and pinion 24 is driven by the first intermediate wheel 8, via the second wheel and pinion 20, to actuate the fourth function of the fourth mechanism.

Furthermore, the linking lever 30 is arranged to cooperate with the pull-out piece 10, which is arranged to this end, in order to tilt at C when the control stem 2 is moved, by a pulling action, from its second to its third position when the hand-setting function is selected in order to position the pinion 34*a* of the wheel and pinion 34 so as to mesh with an intermediate hand-setting wheel 38. Thus, in traditional manner, rotation of the control stem 2, once positioned in the third hand-setting selection position, makes it possible to set the watch's hands.

The linking lever 30 is also arranged to return to its position when the control stem is returned from its third to its second position by a pressing action on the control stem 2.

In order to pivot the actuating lever 16 and its wheels and pinions between its two driving positions, control means are provided which are arranged to cooperate with the control stem 2 to move themselves and to control the movements or pivoting of the actuating lever 16 between its first and second driving positions during the axial translational movements of the control stem 2 into its various positions.

These control means for the actuating lever 16 are constituted by the pull-out piece 10 which fits into the groove of the control stem 2 and having at its end 10*a*, extended beyond the stud 12, a pin 40 arranged to cooperate with the actuating lever 16.

More particularly, the actuating lever 16 bears, between its first side arm 16*a* and its central arm 16*c*, a cam 42 having a profile arranged to cooperate with the pin 40 of the pull-out piece 10 in order to be able to pivot said actuating lever 16 about its axis C, positioned in its neutral position, which is central between the first and second driving positions, when the control stem 2 is in one of its first and third positions, in one direction into one of its first and second driving positions and in the other direction into the other of its first and second driving positions, alternately, for each movement of the control stem 2 into its second position from its first or third position, the actuating lever 16 always passing via the same central neutral position when the control stem 2 is pulled from its second to its third position or pushed back from its second to its first position. The actuating lever 16 is in its neutral position, which is central between the first and second driving positions, when it is not constrained by the pin 40, the control stem 2 then being in one of its first and third positions. A lever spring (not shown) is provided which is arranged to return the actuating lever 16 from one of its first and second driving positions to its central neutral position. Said lever spring has one end fixed to the frame, its other end being arranged to pass between two pins 44*a* and 44*b* (cf. FIGS. 1 and 4) integral with the actuating lever 16 and constituting stops for the lever spring when the actuating lever 16 is in one of its first and second driving positions. When the actuating lever 16 occupies its neutral position, the pin 44*a* which is the closest to the wheels and pinions 18 and 22, passes through the neutral axis D.

The cam profile 42 may be parallelepipedal in shape, the four lateral faces of which form pairs of inclined parallel planes along which the pin 40 of the pull-out piece 10 moves during the successive axial translational movements of the control stem 2 into its various positions.

It is obvious that the profile of the cam 42 may be different depending on the desired angular stroke of the actuating lever 16 and the pulling/pushing effort desired for the control stem 2. For example, an ovoid cam with flattened vertices can be provided.

Thus, when the actuating lever 16 is positioned in its neutral position, which is central between the first and second driving positions, when the control stem 2 is in its first position, the pin 40 cooperates with the cam profile 42 to pivot the actuating lever 16 in anticlockwise direction (by looking dial side) into its first driving position when the control stem 2 is pulled into its second position, in particular to select the first function, then to allow said actuating lever 16 to return to the central neutral position by means of its lever spring when the control stem 2 is pulled into its third position, then to pivot the actuating lever 16 in clockwise direction (by looking dial side) into its second driving position when the control stem 2 is pushed back into its second position, in particular to select the second function, and then to allow said actuating lever 16 to return to its central neutral position by means of its lever spring when the control stem 2 is again pushed into its first position.

Figure 2:
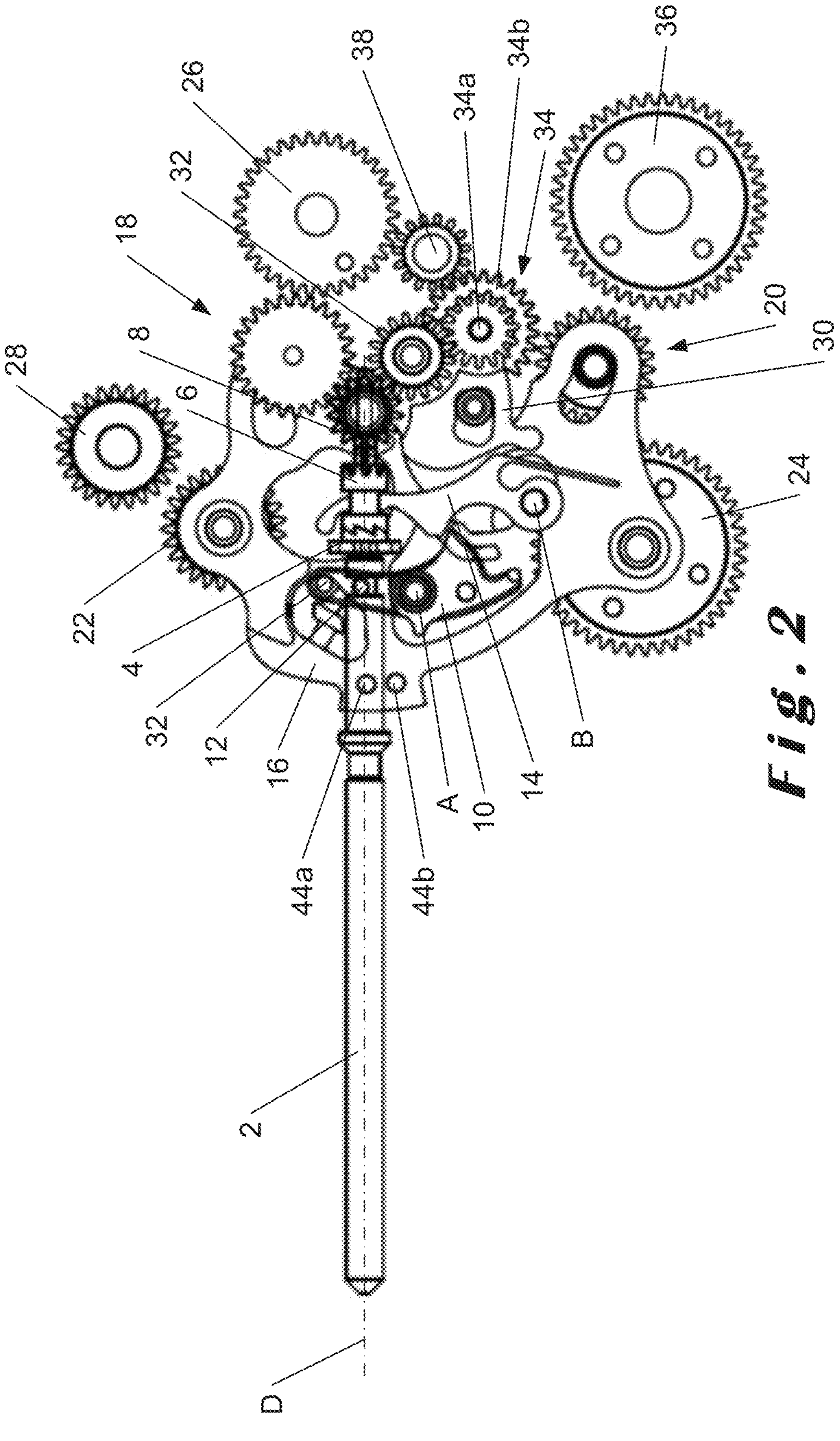
FIG. 2 is a plan view, from the back side, of a selection and actuation device according to the invention, when the control stem is in the first resting position, corresponding to the winding position.
Figure 3:
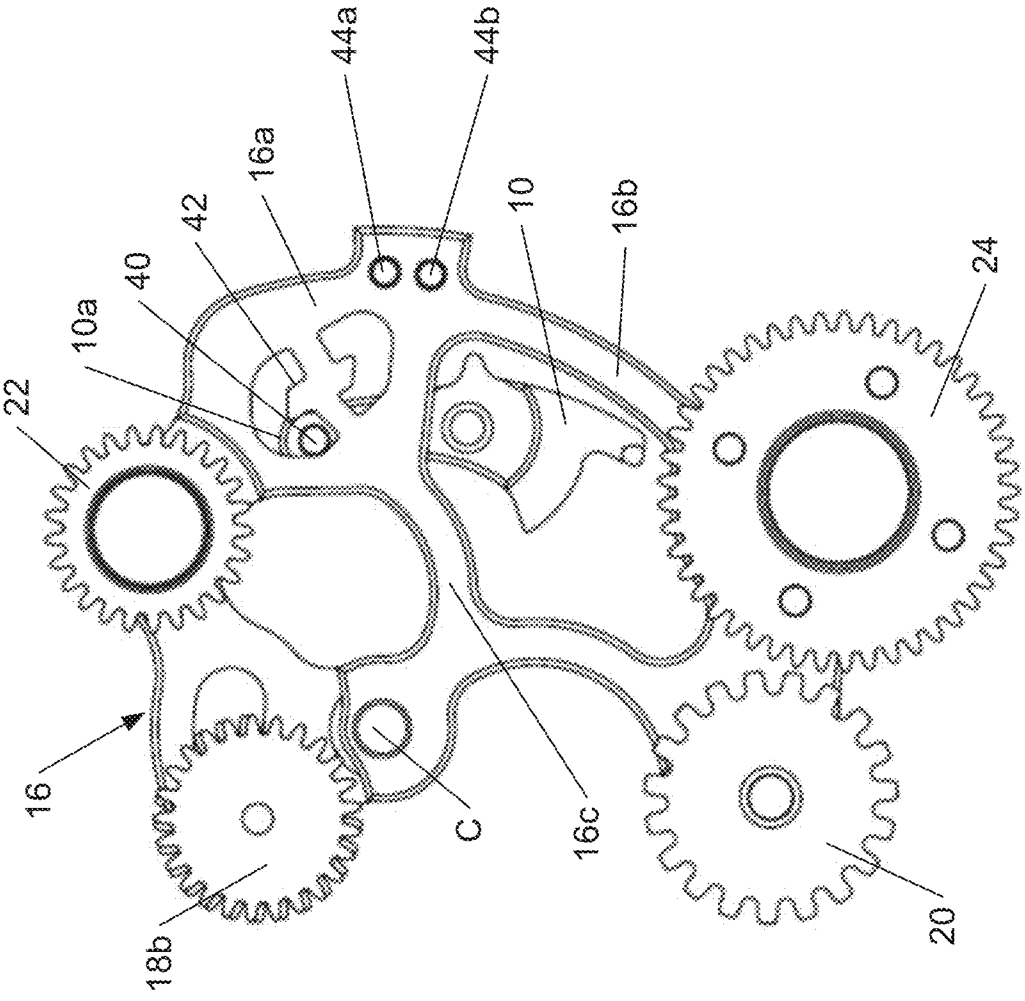
FIG. 3 is a plan view, from the dial side, of the actuating lever and its control means, when the control stem is in the first resting position.
Figure 4:
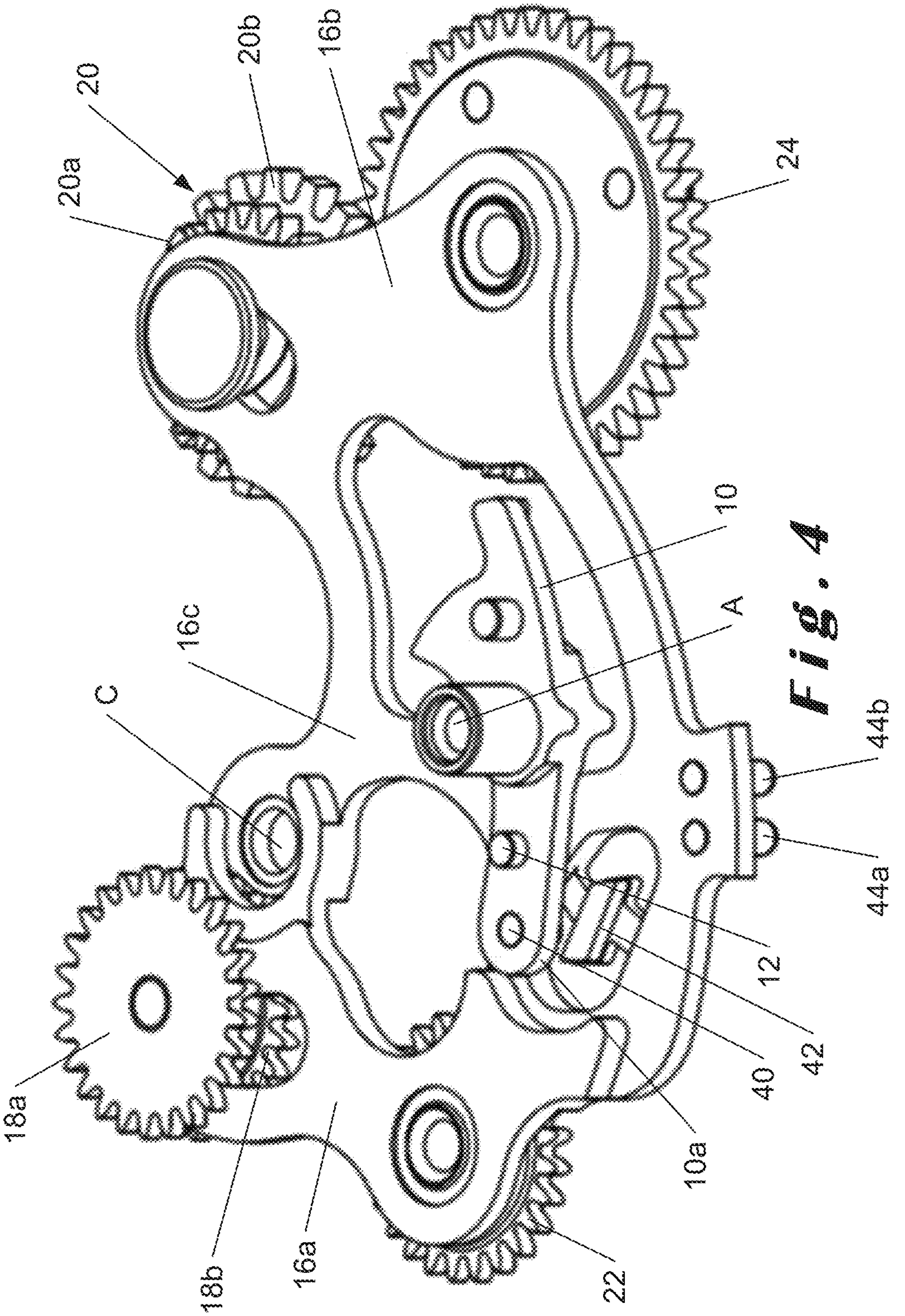
FIG. 4 is an isometric view, from the back side, of the actuating lever and its control means, when the control stem is in the first resting position.

The selection and actuation device according to the invention functions as follows:

With reference to FIGS. 1 and 2, the control stem 2 is in its first winding position, the actuating lever 16 being in its central neutral position between the first and second driving positions. The pull-out piece 10 and the return-bar 14 are positioned in the winding position such that the castle wheel 6 meshes with the winding pinion 4 for winding by rotation of the control stem 2. The first intermediate wheel 8 is therefore inactive when the control stem 2 is turned, such that none of the first, second, third and fourth functions can be actuated.

Figure 5:
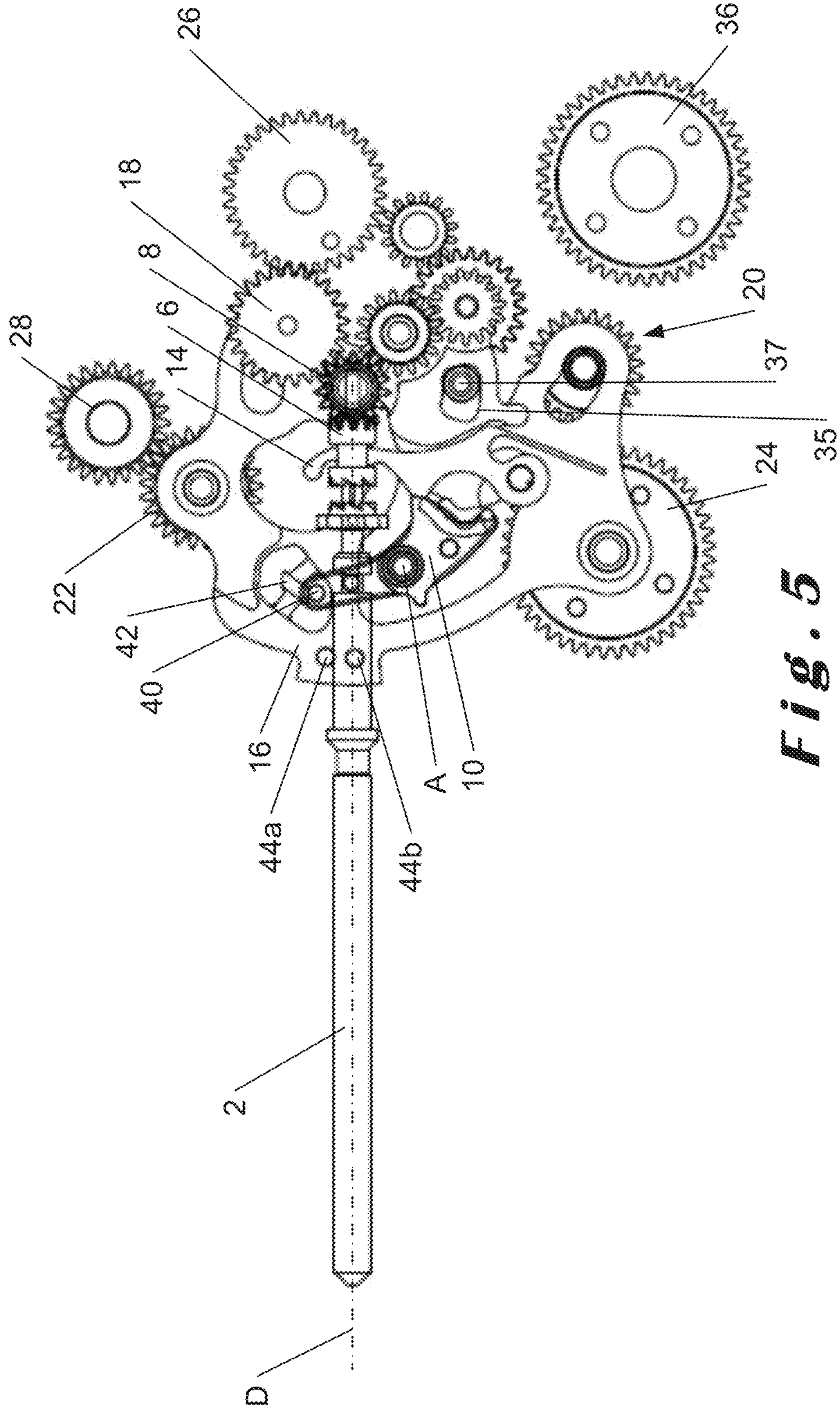
FIG. 5 is a view from the back side of the selection and actuation device of FIG. 1, when the control stem is in the second position for selecting the first and third functions, said first function being actuated by rotation of the control stem in clockwise direction.
Figure 6:
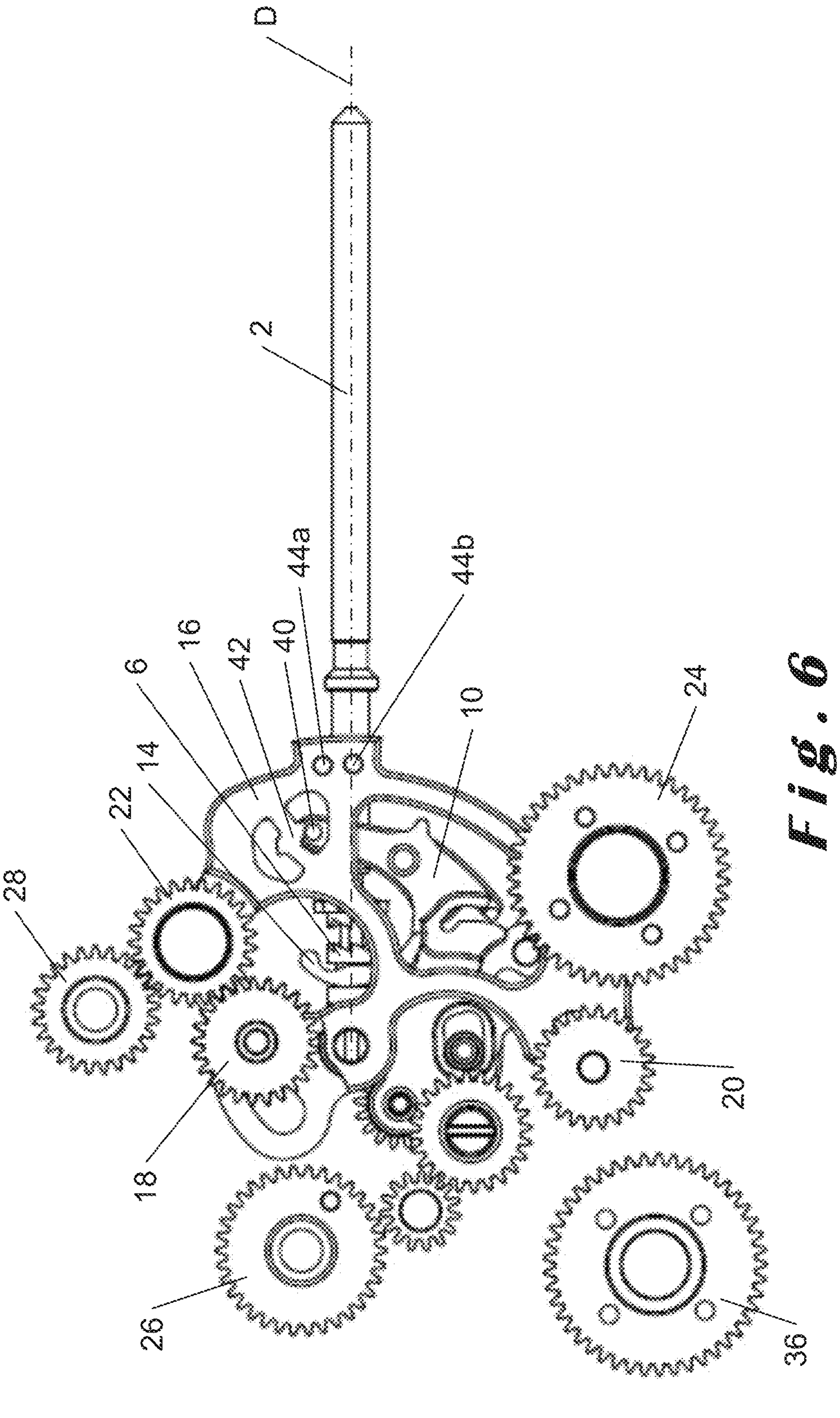
FIG. 6 is a view from the dial side of the selection and actuation device of FIG. 1, when the control stem is in the second position for selecting the first and third functions, said third function being actuated by rotation of the control stem in anticlockwise direction.

With reference to FIGS. 5 and 6, the control stem 2 has been pulled a first time, from its first to its second position, such that the pull-out piece 10 pivots at A into an intermediate position and controls the return-bar 14 to move the castle wheel 6 in mesh with the first intermediate wheel 8. During this pivoting of the pull-out piece 10, its pin 40 works with an inclined plane of the cam 42 so as to tilt the actuating lever 16 in clockwise direction, by looking back side, into its first driving position. During this pivoting of the actuating lever 16 at C, the first wheel and pinion 18, which meshes with the first intermediate wheel 8, comes closer to the wheel 26 of the first mechanism and the third wheel and pinion 22 meshes with the wheel 28 of the third mechanism.

If the control stem 2 is turned in clockwise direction, the first wheel and pinion 18 meshes with the wheel 26 of the first mechanism. Thus, when the control stem 2 is pulled from its first to its second position, the first function can be actuated by rotation of the control stem 2 in clockwise direction, via the castle wheel 6, the first intermediate wheel 8, the first wheel and pinion 18 and the wheel 26, as shown in FIG. 5.

If the control stem 2 is turned in anticlockwise direction, the first sliding wheel and pinion 18 meshes with the third wheel and pinion 22 to drive the wheel 28 of the third mechanism. Thus, when the control stem 2 is pulled from its first to its second position, the third function can be actuated by rotation of the control stem 2 in anticlockwise direction, via the castle wheel 6, the first intermediate wheel 8, the first wheel and pinion 18, the third wheel and pinion 22 and the wheel 28, as shown in FIG. 6.

The inclined plane of the cam 42 remains pressed against the pin 40 under the load of the lever spring.

When the actuating lever 16 is in its first driving position, its second wheel and pinion 20 does not cooperate with the first intermediate wheel 8, such that said second wheel and pinion 20 together with the fourth wheel and pinion 24 are inactive.

Thus, only the first and third functions can be selected by pulling the control stem 2 from its first to its second position, and actuated by rotation of the stem, the second and fourth functions not being selectable in this sequence of positions.

Figure 7:
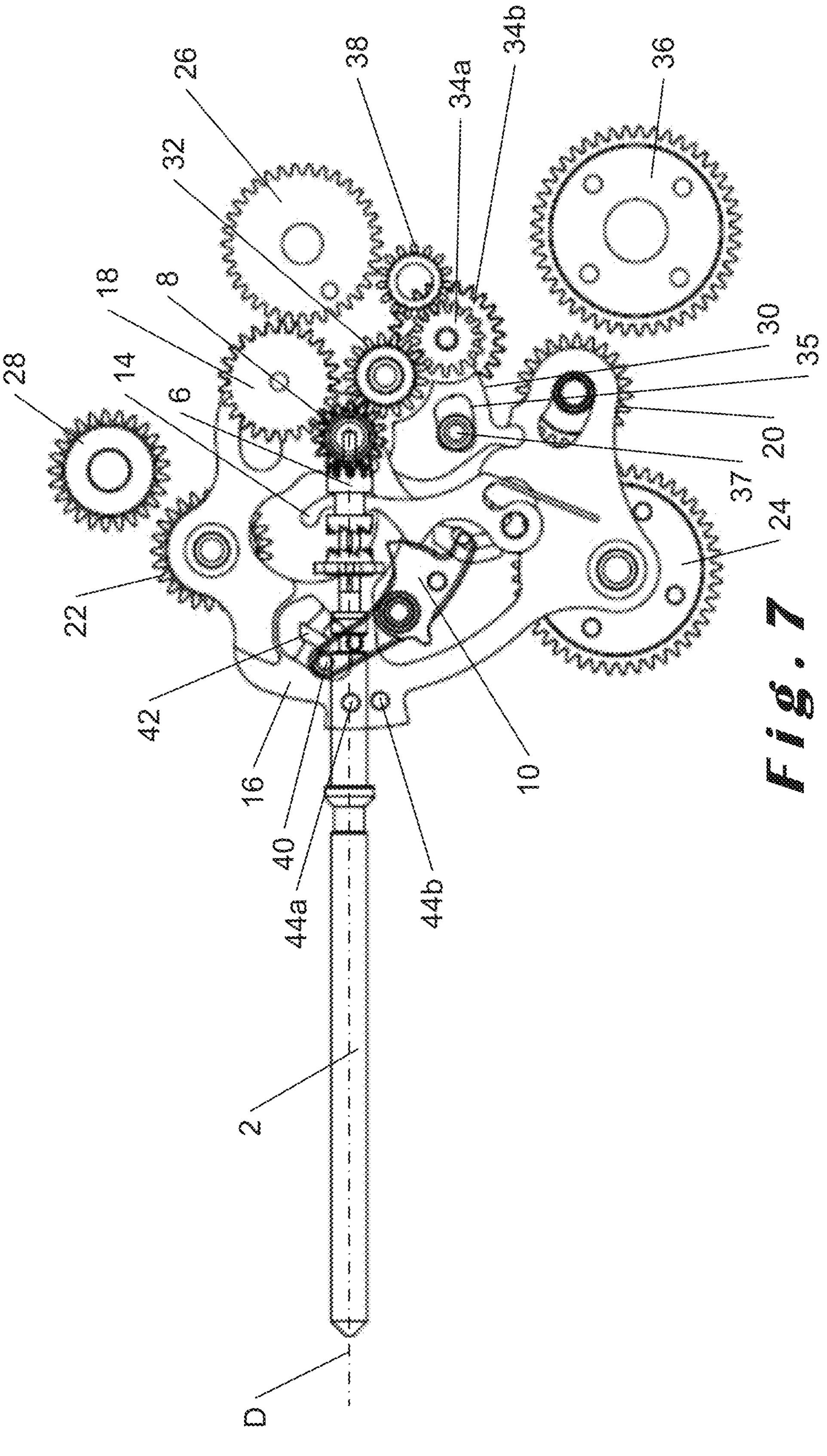
FIG. 7 is a view from the back side of the selection and actuation device of FIG. 1, when the control stem is in the third position for selecting the hand-setting function.

With reference to FIG. 7, the control stem 2 has been pulled once again, from its second to its third position, such that the pull-out piece 10 pivots at A into its extreme position and this time controls the linking lever 30 to pivot according to the axis C, such that the pinion 34*a* meshes with the intermediate hand-setting wheel 38, one of the edges of the opening 35 coming into abutment against the stud 37. The pull-out piece 10 is also arranged to maintain the return-bar 14 in position such that the castle wheel 6 remains meshed with the first intermediate wheel 8.

Thus, when the control stem 2 is pulled from its second to its third position, the hand-setting function can be actuated by rotation of the control stem 2, via the castle wheel 6, the first intermediate wheel 8, the geartrain 32, 34 of the linking lever 30 and the intermediate hand-setting wheel 38, as shown in FIG. 7.

During this pivoting of the pull-out piece 10, its pin 40 falls behind the inclined plane of the cam 42 such that the actuating lever 16 is no longer constrained and returns to its neutral position, which is central between the first and second driving positions, by means of its lever spring (not shown), as shown in FIG. 7. The actuating lever 16 is again remote from the wheels 26 and 28 and the second wheel and pinion 20 is not active, such that none of the first, second, third and fourth functions can be actuated.

Figure 8:
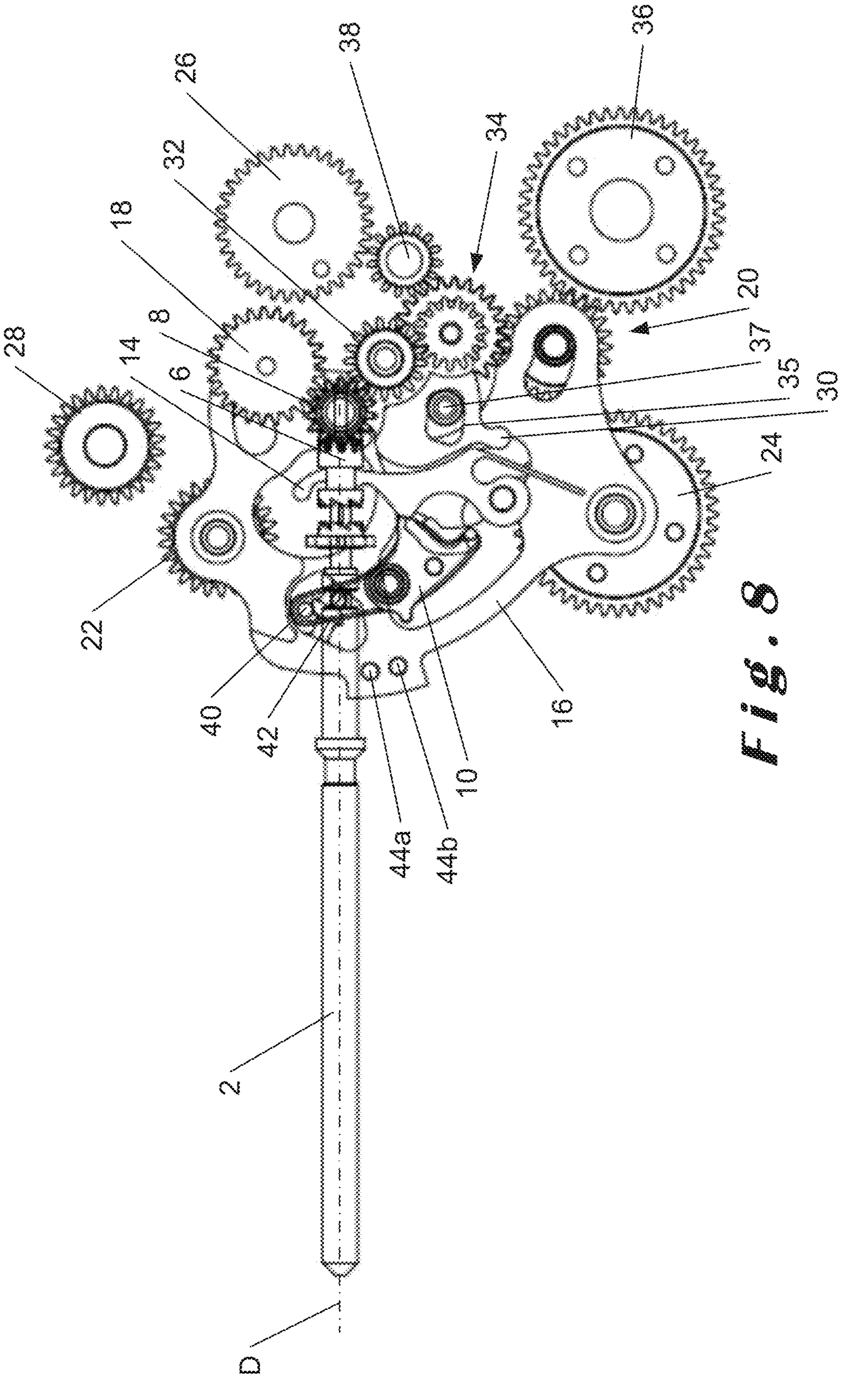
FIG. 8 is a view from the back side of the selection and actuation device of FIG. 1, when the control stem is in the second position for selecting the second and fourth functions, said second function being actuated by rotation of the control stem in anticlockwise direction.
Figure 9:
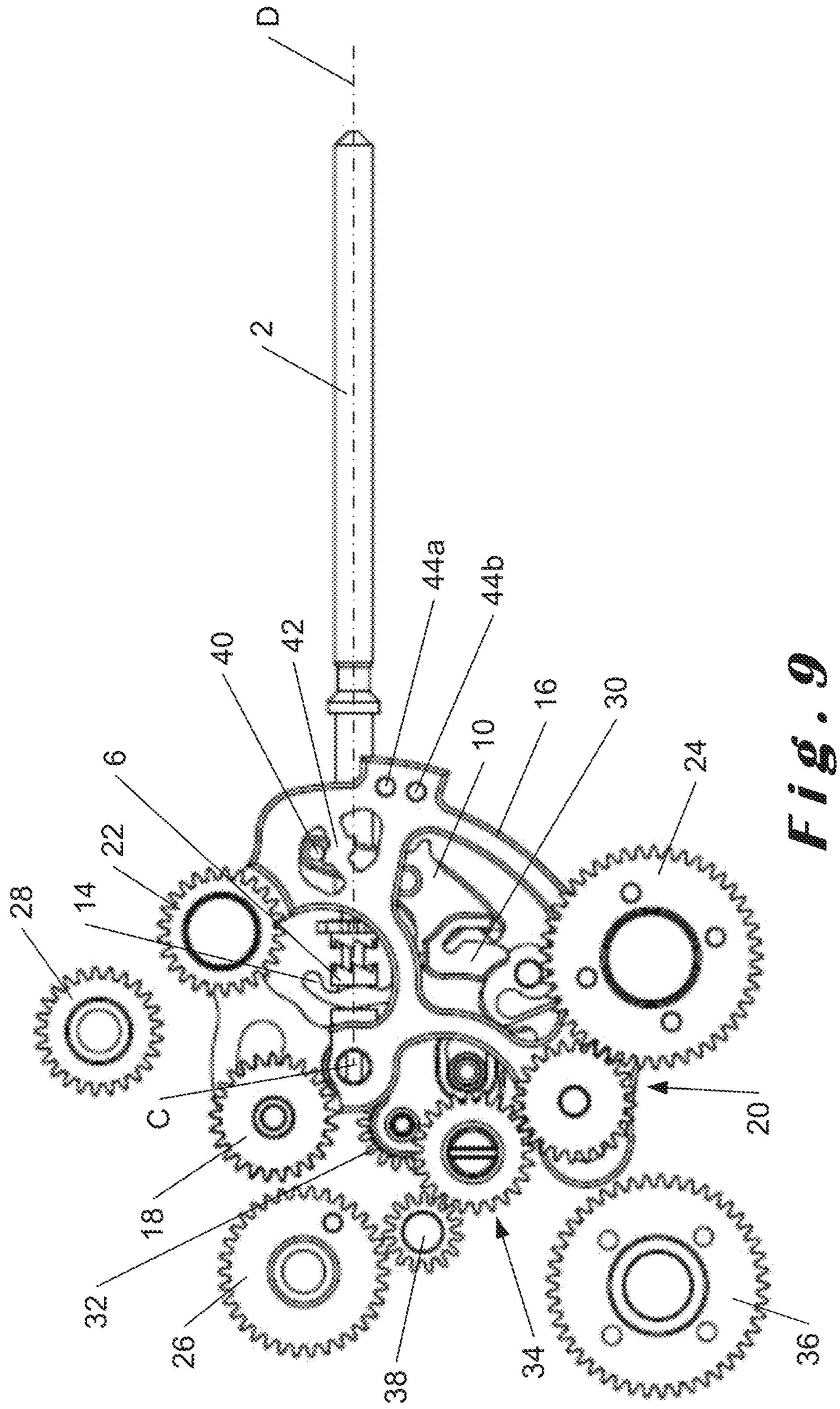
FIG. 9 is a view from the dial side of the selection and actuation device of FIG. 1, when the control stem is in the second position for selecting the second and fourth functions, said fourth function being actuated by rotation of the control stem in clockwise direction.

With reference to FIGS. 8 and 9, the control stem 2 has been pushed back a first time, from its third to its second position, such that the pull-out piece 10 returns to its intermediate position, allowing the linking lever 30 to return to its position, the opposite edge of the opening 35 coming back into abutment against the stud 37 and disengaging the wheel and pinion 34 from the intermediate hand-setting wheel 38. The pull-out piece 10 maintains the return-bar 14 in position such that the castle wheel 6 remains meshed with the first intermediate wheel 8.

During this pivoting of the pull-out piece 10, its pin 40 works with the other inclined plane of the cam 42 and passes up to the top of the cam 42 so as to tilt the actuating lever 16 in anticlockwise direction, by looking back side, into its second driving position. During this pivoting of the actuating lever 16 according to the axis C, the second wheel and pinion 20 meshes with the wheel and pinion 34 and comes closer to the wheel 36 of the second mechanism and the fourth wheel and pinion 24 meshes with the fourth mechanism.

If the control stem 2 is turned in anticlockwise direction, the second wheel and pinion 20 meshes with the wheel 36 of the second mechanism. Thus, when the control stem 2 is pushed back from its third to its second position, the second function can be actuated by rotation of the control stem 2 in anticlockwise direction, via the castle wheel 6, the first intermediate wheel 8, the geartrain 32, 34, the second wheel and pinion 20 and the wheel 36, as shown in FIG. 8.

If the control stem 2 is turned in clockwise direction, the second sliding wheel and pinion 20 meshes with the fourth wheel and pinion 24 to drive the fourth mechanism. Thus when the control stem 2 is pushed back from its third to its second position, the fourth function can be actuated by rotation of the control stem 2 in clockwise direction, via the castle wheel 6, the first intermediate wheel 8, the geartrain 32, 34, the second wheel and pinion 20 and the fourth wheel and pinion 24, as shown in FIG. 9.

When the actuating lever 16 is in its second driving position, its first wheel and pinion 18 is remote from the wheel 26 and the third wheel and pinion 22 is remote from the wheel 28.

Thus, only the second and fourth functions can be selected by pushing the control stem 2 back from its third to its second position, to be actuated by rotation of the stem, the first and third functions not being selectable in this sequence of positions.

Finally, the control stem 2 is pushed back once again, from its second to its first position, such that the pull-out piece 10 pivots at A to return to its initial position. The return-bar 14 also returns to its initial position under the effect of its spring, by moving the castle wheel 6 which returns to cooperate with the winding pinion 4. During this pivoting of the pull-out piece 10, its pin 40 falls from the top of the cam 42 such that the actuating lever 16 is no longer constrained and returns to its neutral position, which is central between the first and second driving positions, by means of its lever spring (not shown). All the elements are back in their FIG. 1 position. The actuating lever 16 is again remote from the wheels 26 and 28 and the second wheel and pinion 20 is not active, such that none of the first, second, third and fourth functions can be actuated.

In the example shown here, the first and second wheels and pinions 18, 20 are arranged to actuate the functions unidirectionally, such that two functions can be selected and actuated when the control stem has been pulled from its first to its second position, and two other functions can be selected and actuated when the control stem has been pushed back from its third to its second position, namely four different functions, while complying with the sequences described above.

With the winding function in the first position and the hand-setting function in the third position, the control stem makes it possible to actuate six different functions by means of a single control stem, while complying with the sequences described above.

It is of course possible to have first and second wheels and pinions 18, 20 arranged to actuate the functions bidirectionally, such that one function can be selected and actuated when the control stem has been pulled from its first to its second position, and another function can be selected and actuated when the control stem has been pushed back from its third to its second position, namely, with winding and hand-setting, four functions brought together on a single control stem, while complying with the sequences described above.

Bidirectional/unidirectional variants can, of course, also be combined.

It is also possible to have bidirectional actuating mechanisms in the first and/or third position. It is thus possible to select and actuate up to eight different independent functions by means of a single control stem 2, while complying with the sequences described above. Any corrector traditionally positioned on the flank of the watch becomes unnecessary, so solving the usual tightness issues.

Since the actuating lever used in the present invention is pivotally mounted between two driving positions on either side of the neutral axis and bears, on each side of the neutral axis, at least two, and in particular four, wheels and pinions to actuate at least two, and in particular four, different mechanisms, said mechanisms may then be disposed practically anywhere in the movement since they are reachable from both sides of the neutral axis during pivoting of the actuating lever in relation to its neutral position, in one direction or the other on either side of said neutral axis. Thus, the invention makes it possible to benefit from a great freedom of arrangement of these mechanisms within the movement or calibre. This makes it possible for example to obtain a smaller calibre when a large number of functions is to be actuated by the same control stem.

The functions can be easily and simply selected by pulling or pushing the control stem between its various positions, according to the sequences described above, these functions also being easily achieved by simply rotating the control stem.

The control stem is advantageously a three-position winding stem, it being straightforward to implement the selection and actuation device according to the invention without modifying the basic mechanism of the stem.

Any other control stem may obviously be used.

The invention claimed is:

1. A selection and actuation device for a plurality of functions of a watch movement comprising at least a first function of a first mechanism of the movement and a second function of a second mechanism of the movement, said device comprising a translationally and rotationally movable control stem for respectively selecting and actuating at least one or the other of said functions, said control stem being arranged to be capable of occupying at least first, second and third distinct, successive axial positions, said device comprising means for actuating at least the first and the second functions, which means are arranged to be kinematically linked to the control stem such that one of the first and second functions can be actuated after having been selected solely by an axial translational movement of the control stem from the control stem's first position to the control stem's second position, and such that the other of the first and second functions can be actuated after having been selected solely by an axial translational movement of the control stem from the control stem's third position to the control stem's second position, wherein the means for actuating at least the first function and the second function comprise an actuating lever bearing at least a first wheel and pinion and a second wheel and pinion, said actuating lever being arranged to be capable of occupying a neutral position when the control stem is in one of the control stem's first and third positions, and to be capable of pivoting, on either side of said neutral position, between a first driving position in which said first wheel and pinion (18) is kinematically linked to the control stem in order to be capable of actuating at least the first function in response to a rotation of the control stem in at least a first direction and a second driving position in which said second wheel and pinion is kinematically linked to the control stem in order to be capable of actuating at least the second function in response to a rotation of the control stem in at least a second direction, identical to or different from the first direction, said actuating lever being arranged to pivot into the actuating lever's first driving position when the first function is selected and to pivot into the actuating lever's second driving position when the second function is selected.

2. A device according to claim 1, wherein the actuating lever is arranged to be capable of actuating a third function of a third mechanism of the movement when said lever is in the lever's first driving position in response to a rotation of the control stem in a third direction opposed to the first direction, selection of the third function being made concomitantly with selection of the first function.

3. A device according to claim 2, wherein the actuating lever comprises a third wheel and pinion arranged to be capable of meshing with the third mechanism when the actuating lever is in the actuating lever's first driving position and wherein the first wheel and pinion is mounted slidingly so as to mesh with and drive the third wheel and pinion when the control stem is axially rotated in the third direction to actuate the third function.

4. A device according to claim 1, wherein the actuating lever is arranged to be capable of actuating a fourth function of a fourth mechanism of the movement when said lever is in the lever's second driving position in response to a rotation of the control stem in a fourth direction opposed to the second direction, selection of the fourth function being made concomitantly with selection of the second function.

5. A device according to claim 4, wherein the actuating lever comprises a fourth wheel and pinion arranged to be capable of meshing with the fourth mechanism when the actuating lever is in the actuating lever's second driving position and wherein the second wheel and pinion is mounted slidingly so as to mesh with and drive the fourth wheel and pinion when the control stem is axially rotated in the fourth direction to actuate the fourth function.

6. A device according to claim 4, wherein the third and fourth functions are correction functions.

7. A device according to claim 1, further comprising control means for said actuating lever which are arranged to cooperate with the control stem to move themselves and to control the movements of the actuating lever between the actuating lever's first and second driving positions during the axial translational movements of said control stem into the control stem's various positions.

8. A device according to claim 7, wherein the control means for the actuating lever are constituted by a pull-out piece which fits into a groove of the control stem and having at its an end of the pull-out piece a pin arranged to cooperate with the actuating lever.

9. A device according to claim 8, wherein the actuating lever bears a cam having a profile arranged to cooperate with the pin of the pull-out piece in order to be able to pivot said actuating lever, positioned in said actuating lever's neutral position when the control stem is in one of the control stem's first and third positions, in one direction into one of said actuating lever's first and second driving positions and in the other direction into the other of said actuating lever's first and second driving positions, alternately, for each movement of the control stem into the control stem's second position from the control stem's first or third position.

10. A device according to claim 9, wherein the cam profile is parallelepipedal in shape, the four lateral faces of which form pairs of inclined parallel planes along which the pin of the pull-out piece moves during the successive axial translational movements of the control stem into the control stem's various positions.

11. A device according to claim 8, wherein the pull-out piece is arranged to control a movement of a castle wheel mounted slidingly on the control stem to mesh with a first intermediate wheel when the control stem is in the control stem's second or third position, said first intermediate wheel being arranged to kinematically link the control stem to the first wheel and pinion or to the second wheel and pinion when the control stem is in the control stem's second position.

12. A device according to claim 11, wherein the pull-out piece is arranged to cooperate with a linking lever bearing geartrains kinematically linked to the first intermediate wheel and arranged to be capable of pivoting when the control stem is moved into the control stem's third position when at least a fifth function of a fifth mechanism of the movement is selected so as to position said geartrains in kinematic linkage with said fifth mechanism and to return to its position when the control stem is moved from the control stem's third to the control stem's second position.

13. A device according to claim 12, wherein the fifth function selected when the control stem is in the control stem's third position is a hand-setting function.

14. A device according to claim 11, wherein the first wheel and pinion is arranged to be capable of meshing with the first mechanism when the actuating lever is in the actuating lever's first driving position and to be driven by the first intermediate wheel when the control stem is axially rotated in the first direction to actuate the first function, and wherein the second wheel and pinion is arranged to be capable of meshing with the second mechanism when the actuating lever is in the actuating lever's second driving position and to be driven by means of the first intermediate wheel when the control stem is axially rotated in the second direction to actuate the second function.

15. A device according to claim 1, wherein the first and second functions are correction functions.

16. A device according to claim 1, wherein the actuating lever is pivotally mounted about an axis perpendicular and secant to a neutral axis defined by the direction of the control stem, the first wheel and pinion and the second wheel and pinion being disposed on each side of said neutral axis.

17. A device according to claim 1, wherein the control stem is a winding stem and wherein the first position is a winding position.

18. A device according to claim 1, wherein the axial translational movement of the control stem from the control stem's first position to the control stem's second position is in response to an axial pulling action on said control stem and the axial translational movement of the control stem from the control stem's third position to the control stem's second position is in response to an axial pressing action on said control stem.

19. A watch movement comprising a selection and actuation device for a plurality of functions according to claim 1.

20. A timepiece comprising a watch movement according to claim 19.

* * * * *